United States Patent [19]

Lagos

[11] Patent Number: 5,023,015

[45] Date of Patent: Jun. 11, 1991

[54] METHOD OF PHOSPHOR PREPARATION

[75] Inventor: Costas C. Lagos, Danvers, Mass.

[73] Assignee: GTE Products Corporation, Danvers, Mass.

[21] Appl. No.: 452,900

[22] Filed: Dec. 19, 1989

[51] Int. Cl.$^5$ ............................................. C09K 11/63
[52] U.S. Cl. ............................................. 252/301.4 R
[58] Field of Search ................. 252/301.4 R, 301.4 R, 252/301.4 H

[56] References Cited

U.S. PATENT DOCUMENTS

| 3,431,215 | 3/1969 | Chenot | 252/301.4 H |
| 3,431,216 | 3/1969 | Chenot | 252/301.4 H |
| 3,709,826 | 1/1973 | Pitt et al. | 252/301.4 P |
| 3,923,682 | 12/1975 | Dale et al. | 252/301.4 R |
| 4,719,033 | 1/1988 | Chenot et al. | 252/301.4 R |
| 4,925,702 | 5/1990 | Reddy | 252/301.4 R |

FOREIGN PATENT DOCUMENTS 1509119  4/1978  United Kingdom .

OTHER PUBLICATIONS

Torii et al., "Chem. Abstracts", vol. 82, 1975, 37922w.

Primary Examiner—Jack Cooper
Attorney, Agent, or Firm—Martha A. Finnegan

[57] ABSTRACT

An improved method for preparing a phosphor is disclosed. The method of the invention includes preparing a solution comprising the non-oxygen elements of the phosphor in molar proportions equal to the respective molar proportions of the non-oxygen elements in the phosphor; precipitating the non-oxygen elements from the solution through the addition of a precipitating agent; spray drying the solution including the precipitate to form a spray dried powder; and firing the spray dried powder in a single firing step. The single firing step of the method comprises (a) increasing the temperature of the spray dried powder at an even and controlled rate from room temperature to a firing temperature sufficiently high to convert the spray dried powder to the phosphor; and (b) maintaining the temperature of the spray dried powder at the firing temperature for a period of time sufficient to produce the phosphor. The method is particularly useful in the preparation of $Eu^{2+}$-activted strontium borate phosphor.

9 Claims, No Drawings

METHOD OF PHOSPHOR PREPARATION

TECHNICAL FIELD OF THE INVENTION

This invention relates to phosphors and more particularly to a method for preparing phosphors.

BACKGROUND OF THE INVENTION

Phosphors are generally prepared by mixing the raw materials in one of two different ways: either dry mixing or wet mixing. With dry mixing, all of the phosphor raw materials are dry mixed (i.e., without liquid) in either a ball mill with pebbles or in some sort of dry mix V-blender, followed thereafter by some sort of calcining. A major disadvantage associated with dry mixing is that a completely homogeneous mixture of the materials is rarely, if at all, obtained.

With wet mixing, the raw materials are dissolved and mixed together in solution form and treated with a precipitating agent, usually an aqueous base, in order to form a precipitate which contains all of the non-oxygen elements of the phosphor. The precipitate is then dried and usually ground prior to the phosphor formation step, namely: calcining to form and crystallize the phosphor.

The calcining (or firing) procedure used with either the dry mixing or wet mixing technique in many cases involves two firings, the first of which is a Pre-firing followed by a second final firing in a reducing atmosphere in order to bring the phosphor activator into the proper valence state. The product of the first firing must be pulverized before the second firing step is performed.

SUMMARY OF THE INVENTION

In accordance with the present invention, there is provided an improved method for preparing a phosphor. The method of the invention achieves a homogeneous mixture of the raw materials and also advantageously includes only one firing step. The method of the invention comprises: preparing a solution comprising the non-oxygen elements of the phosphor in molar proportions equal to the respective molar proportions of the non-oxygen elements in the phosphor; precipitating the non-oxygen elements from the solution by adding a precipitating agent thereto to form a precipitate; spray drying the solution including the precipitate to form a spray dried powder; and firing the spray dried powder in a single firing step comprising (a) increasing the temperature of the spray dried powder at an even rate from room temperature to a firing temperature sufficiently high to convert the spray dried powder to the phosphor; and (b) maintaining the temperature of the spray dried powder at the firing temperature for a period of time sufficient to produce the phosphor.

For a better understanding of the present invention, together with the advantages and capabilities thereof, reference is made to the following disclosure and appended claims.

DETAILED DESCRIPTION

This invention relates to an improved method for preparing a Phosphor. As described above, the method of the invention includes: preparing a solution comprising the non-oxygen elements of the phosphor in molar proportions equal to their respective molar proportions in the phosphor; precipitating the non-oxygen elements from the solution through the addition of a precipitating agent to form a precipitate which includes the non-oxygen elements in insoluble compounds which may further include oxygen, hydrogen, and the like. The oxygen content of the phosphor is supplied from oxygen contained in the precipitate. When firing is not carried out in a reducing atmosphere, oxygen may alternatively be supplied from the firing atmosphere. The firing atmosphere is determined by the particular phosphor being prepared. Such determination is routine to one of ordinary skill in the phosphor art. The precipitate and solution is then spray dried, after which it is fired in a single firing step.

The single firing step includes (a) increasing the temperature of the spray dried powder at an even and controlled rate (°C/minute) from room temperature (also referred to herein as "the temperature of a cold furnace") to a firing temperature sufficiently high to form the phosphor and (b) maintaining the temperature of the spray dried powder at the firing temperature for a period of time sufficient to produce the phosphor.

The selection of the appropriate firing temperature is also a routine determination to one of ordinary skill in the phosphor art.

In the method of the invention, the temperature of the spray dried powder is brought from room temperature to the firing temperature at an even rate by controlled, sequentially timed temperature increments of approximately equal magnitude. Such controlled, sequentially timed temperature increases programmed microprocessor, as is hereinafter discussed.

By bringing the temperature of the spray dried powder from room temperature to the firing temperature at an even and controlled rate, the need for a pre-firing step is eliminated. Additionally, such firing step slowly decomposes any hydrates that may be Present in the raw materials. Such slow decomposition of hydrates prevents frothing, sintering and/or possible splattering of powder, which usually occurs when a raw material powder containing hydrates is placed directly into a very hot furnace, is prevented.

The present invention is particularly advantageous in the preparation of divalent europium doped strontium orthoborate phosphor. This phosphor has an emission peak at approximately 370 nm and a relatively narrow half height width of approximately 18 nm. The empirical formula for this particular phosphor is $SR_{1-x}B_4O_7$:$Eu_x^{+2}$, wherein x is from about 0.005 to about 0.05. A specific example of an application in which this phosphor is particularly useful is in artificial "suntanning" where fluorescent lamps of 370 nm emission are used to tan the human skin. This particular application is given only by way of example and is not to be construed as limiting other applications in which this phosphor is or can be used.

The following three examples are provided to more fully demonstrate the uniqueness and advantages of the present invention.

Example I describes the preparation of a phosphor wherein the raw materials are dry mixed. Example II describes the preparation of a phosphor wherein the raw materials are wet mixed. Example III describes the preparation of a phosphor in accordance with the present invention.

The raw batch phosphor formulation used in each of the examples includes the non-oxygen elements in the relative molar proportions indicated in the following formulation:

$SR_{0.98}B_{4.1}O_7:Eu_{0.02}$

This formulation is based upon including boron in a molar proportion of 4.1 rather than 4.0 in order to compensate for loss thereof during calcining through sublimation.

The inclusion of a 4.1 molar proportion of boron in the raw batch formulation produces a single phase finished phosphor material. This has been confirmed by X-ray diffraction data. Such x-ray diffraction data reveal that only an $SrB_4O_7$ phase is present in the final fired phosphor; no other phases such as $SrB_2O_4$ and $SrB_6O_{10}$ are detected in the final phosphor material.

As will be discussed more completely below, the amount of boron also assists in controlling the particle size of the finished phosphor prepared in accordance with the present invention.

EXAMPLE I

The first of the two well known phosphor preparation techniques involves dry mixing the raw materials followed by two separate firing steps.

Using standard dry mix processing, which is well-known in the phosphor art, 0.98 moles of $SrCO_3$, 4.1 moles of $H_3BO_3$, and 0.01 moles of $Eu_2O_3$, all powders capable of passing through a 60 mesh sieve, were well mixed in a ball mill with flint pebbles for at least one hour. (Alternatively, other mixing devices, such as a Patterson-Kelley V-blender with an intensifier bar, could be used.)

The mixed raw materials were then placed in a $2'' \times 1\frac{1}{2}'' \times 6''$ silica boat and pre-fired at a temperature of about 800° C. for 2–4 hours in an air atmosphere. (The purpose of this firing step is to form the $SrB_4O_7$ matrix compound.) This step does not produce a luminescent material having an emission peak at 370 nm, because the trivalent europium has not yet been reduced to its divalent state, which produces 370 nm emission upon excitation by 253.7 nm radiation.

After the pre-firing step, the powder was pulverized and fired again for 3–5 hours at about 940° C. in a flowing, reducing atmosphere of about 98% $N_2$–2% $H_2$ (the percentages representing volume percent) in order to reduce $Eu^{+3}$ to $Eu^{+2}$. The refired powder was broken up and pulverized to a particle size fine enough to produce a smooth, uniform texture coating when applied to the inner surface of a fluorescent lamp envelope.

The above-described dry mix-two step firing method has several disadvantages. First, $H_3BO_3$ decomposes very readily at about 200° C.–300° C. Because these temperatures are attained well before the $SrB_4O_7$ matrix is formed, boron is lost from the formulation mixture during pre-firing through sublimation. The boron deficiency caused by sublimation of boron during pre-firing often results in the formation of an undesired $SrB_2O_4$ impurity phase in addition to the $SrB_4O_7$ phosphor matrix compound. Incorporation of the divalent europium activator into the $SrB_2O_4$ impurity phase forms $SrB_2O_4:Eu^{+2}$, which is a blue emitting phosphor. $SrB_2O_4:Eu$ The occurrence of such blue emission in the lamp emission spectrum detracts from the efficiency of the 370 nm light. If the pre-firing temperature is dropped much below 800° C. in order to minimize the boron loss, a good crystalline $SrB_4O_7$ matrix lattice will not be formed.

The inclusion of from about 0.05 to about 0.2 moles of excess boron in the raw batch formulation mixture overcomes the problems associated with boron loss. Inclusion of excess boron in an amount greater than about 0.2 moles is accompanied by two undesirable effects: (1) the formation of an $SrB_6O_{10}$ impurity phase; and (2) the occurrence of frothing during firing and subsequent formation of a foamy, glassy-type of material.

The formation of an $SrB_6O_{10}$ impurity phase is undesirable because its presence in the phosphor is detrimental to the 370 nm $SrB_4O_7:Eu^{+2}$ phosphor efficiency. The occurrence of frothing during firing is undesirable because it leads to the formation of a foamy, glassy-type of material which is very difficult to pulverize for the second firing in a reducing atmosphere.

If any of the excess boron is still present as $H_3BO_3$ in the finished phosphor, it should be removed prior to placing the phosphor in a fluorescent lamp, since the $H_3BO_3$ has a tendency to react with the organic binder used in conventional lamp coating processes and form a brown discoloration during lamp bakeout which detracts greatly from lamp efficiency.

In summary, the dry mix process for the synthesis of $SrB_4O_7:Eu^{+2}$ does not provide a homogeneous raw batch mixture, while at the same time requiring a two-step firing method involving a pulverizing step therebetween. The dry mix process is extremely sensitive, making it extremely difficult to obtain reproducible results, due in part to the volatility of the $H_3BO_3$ raw material.

EXAMPLE II

The second of the well known phosphor preparation techniques involves wet mixing.

In this example, 0.98 moles of $SrCO_3$, moles of $Eu_2O_3$, and 4.1 moles of $H_3BO_3$ were suspended in 70° C. deionized water. Concentrated $HNO_3$ was added to to the suspension to dissolve the solid phosphor precursor materials and form a solution. Equal volumes of $NH_4OH$ and acetone were then added to the solution so that a mixed hydroxide was precipitated. The precipitate was filtered, oven dried, pulverized, and then pre-fired in air. Next, the fired powder was pulverized again and fired again in a reducing atmosphere, as in Example I.

The wet precipitation technique provides a more uniform phosphor powder than the dry mix technique, but it still involves a drying/pulverizing process and two firings with a repulverizing step in between.

EXAMPLE III

This Example represents a preferred embodiment of the method of the invention. This example is provided to aid in the understanding of the present invention, but is not to be construed as a limitation thereof.

A solution of $Sr(NO_3)_2$ was prepared by dissolving 0.98 moles of the compound in water. A solution of Eu was prepared by dissolving 0.01 moles of the europium (III) oxide in a small amount of $HNO_3$ and water to form a $Eu(NO_3)_3$ solution. A solution of $H_3BO_3$ was prepared by dissolving 4.1 moles of the compound in water. These three solutions were admixed and the pH of the resultant solution was adjusted to be within the range from about 10 to about 12 by the addition of $NH_4OH$ to form a precipitate of europium (III) hydroxide, boron hydroxide, and strontium hydroxide. The suspension was then spray dried using a Buchi 190 mini spray dryer, the spray dried powder having a white and somewhat fluffy appearance.

The solutions may alternatively be passed through the spray dryer without the prior addition of NH₄OH. Preferably, however, it is passed through the spray dryer after the addition of NH₄OH and formation of the precipitate. It has been found that spray drying the solution after the precipitation step produces a superior phosphor, as described below.

When the solution was spray dried without a precipitation step, the subsequent firing of the spray dried powder produced a phosphor which was a mixture of about 75% $SrB_4O_7$ and 25% $SrB_2O_4$, as determined by x-ray diffraction. Even the use of a large excess of $H_3BO_3$ (initially, as much as 25% by weight) resulted in the same 75% $SrB_4O_7$-25% $SrB_2O_4$ mixture in the final phosphor. This deficiency in boron was the result of some $H_3BO_3$ being lost during the spray drying due to the solution being acidic.

When the solution was spray-dried after formation of the precipitate by the addition of NH₄OH, no $H_3BO_3$ is lost during the spray drying process. This was shown by x-ray diffraction measurement of the phosphor after the subsequent firing step, which shows 100% $SrB_4O_7$ formation with no other phases present.

With the utilization of the spray dry technique after treatment with NH₄OH, a satisfactory phosphor can be obtained without including excess boron in the raw batch formulation, i.e., with only 4.0 moles of $H_3BO_3$ included in the phosphor formulation.

The use of the 0.1 mole excess of $H_3BO_3$ in the solution is not detrimental in the final phosphor and subsequent fluorescent lamp use. In fact, this slight excess of $H_3BO_3$ is beneficial in producing a phosphor having larger particle size, e.g., about 17-18 micrometers.

The use of 4.2 moles $H_3BO_3$ produces an even larger average particle-size of 20.5 micrometers.

These particle size measurements were obtained using a Leeds and Northrup Microtrac particle-size analyzer).

No undesirable compounds or phases were obtained with an excess of either 0.1 or 0.2 moles of $H_3BO_3$. The advantage of using 4.1 rather than 4.2 moles of $H_3BO_3$ with the use of the spray dry technique, however, is that the final fired phosphor powder is softer and easier to process for coating a $SrB_6O_{10}$ compound is found when either 4.1 or 4.2 boron is used.

The advantages of the method of the invention including the spray drying step in the preparation of the above-described europium (II) activated strontium borate phosphor is demonstrated by the following.

Tests were made where the NH₄OH precipitation product was simply filtered, dried, and put through the single firing step of the invention:

1. The 370 nm peak height intensity of this phosphor was only 30% of that phosphor which had been spray dried and identically fired.

2. X-ray diffraction data indicated that about 25% of the undesirable $SrB_2O_4$ was also present. (It is believed that some of the added $H_3BO_3$ was still in the filtrate of the filtered suspension and this resulted in a boron deficiency in the precipitate and the subsequent formation of $SrB_2O_4$ in addition to the $SrB_4O_7$.)

The method of the present invention further includes a heating step which comprises (a) increasing the temperature of the spray-dried material in a cold furnace by sequentially timed and equal incremental amounts to the desired firing temperature and (b) holding the temperature at the firing temperature for a period of time sufficient to produce the phosphor. The heating step is preferably accomplished (by volume) in order to reduce the $Eu^{+3}$ in the powder to $Eu^{+2}$.

In a most preferred embodiment, the heating step is carried out in a furnace equipped with a microprocessor programmed to increase the temperature by precise equal increments at precise time intervals.

Preferably the temperature is increased from room temperature to the desired firing temperature at a rate from about 4.2° C. to about 5.5° C. per minute. Most preferably, the temperature is raised at the rate of of 5.2° C. per minute. For example, at the rate of 5.2° C. per minute, when preparing the above-described strontium borate phosphor activated by $Eu^{++}$, it would take about 3 hours to reach the optimum firing temperature of 942° C. Once this temperature is reached, the powder is left to "soak" at 942° C. for 4 hours at which point the furnace is programmed to shut off. The powder is then allowed to cool to room temperature in the furnace in the presence of the flowing $N_2$-$H_2$ atmosphere. After removing the powder from the furnace, the very soft cake is broken up and sieved through a 325 mesh screen, washed with hot water to remove any possible residual $H_3BO_3$ and it is then ready for being applied as a coating in a fluorescent lamp.

The use of a pre-firing step in air with the spray dried powder has been found to be detrimental to phosphor emission intensity. Pre-firing temperatures in air from 500° C. to 900° C., followed by a subsequent reduction firing at 942° C., resulted in phosphor intensities which were at least 10% less intense than phosphor samples obtained by the use of the "ramp up" firing process described previously.

With regard to the best conditions for the $SrB_4O_7$:$Eu^{+2}$ phosphor to give it the most intense 370 nm emission peak, it has been found that:

1. For the formulation $Sr_{1-x}B_yO_7$:$Eu_x$:

x may be varied from 0.005 to 0.05 with a value of 0.02 giving the best 370 nm peak height emission intensity.

y should be at least 4.0 with variations up to 4.2 being permitted. y=4.1 is preferred. Higher y than 4.2 results in the formation of $SrB_6O_{10}$ and sintering and melting during the 942° C. firing. Lower than 4.0 for y results in the formation of the undesirable $SrB_2O_4$. Other alkaline earth cations such as Ca, Ba, and Mg may be partially substituted for Sr, but in our particular method of preparation, we have found no advantages with their use.

2. The optimum firing temperature is 942° C. Temperatures much lower than this result in lower phosphor intensity. In the 920° C.-942° C. temperature range there is only about a 5% intensity decrease, but the emission intensity begins to drop off drastically below 920° C. Temperatures higher than 942° C. result in a sintering and partial melting of the phosphor powder. Increasing the temperature of the spray dried powder at a rate greater than about 5.5° C./minute produces a phosphor with decreased phosphor intensities, as do "soak" times of less than 4 hours. Increasing the temperature at rates slower than about 5.1°-5.2° C./minute and/or utilizing "soak" times greater than four (4) hours poses no disadvantage.

The following is an example of a most preferred embodiment of the method of the present invention.

EXAMPLE IV 0.98 moles ( 41.47 grams) of $Sr(NO_3)_2$ was dissolved in about 100 ml of deionized water.

4.1 moles (50.70 grams) of $H_3BO_3$ was dissolved in about 1600 ml of deionized water.

0.01 moles (0.70 grams) of $Eu_2O_3$ was dissolved in about 10 ml of a 50-50 mixture of deionized water and concentrated $HNO_3$.

The 3 solutions were mixed together to form a clear solution.

Seventy milliliters of $NH_4OH$ was then added to the clear solution to bring the pH between 10-12 and precipitate the mixed hydroxides and/or borates.

The suspension was then stirred for about 5 minutes to ensure a complete precipitation and to prepare the entire mixture for spray drying.

A Buchi 190 Model mini spray dryer was used. The internal temperature setting of the spray dryer was set at about 190° C. which gave an external temperature of about 52° C. The flow rate of the suspension was about 16 ml/minute to the spray nozzle of the spray dryer. The precipitate was kept in suspension in its reservoir by constant stirring. The external temperature of the spray dryer was not allowed to go below 50° C. This temperature was somewhat controlled by the suspension flow rate to the nozzle which was decreased or increased slightly in order to keep the external temperature in the 50° C.-55° C. range. Temperatures below 50° C. usually resulted, subsequently, in a decreased final phosphor emission intensity.

After the entire suspension of approximately 2 liters was passed through the spray dryer, the collected powder was then ready for the single firing step.

Eighty grams of the spray dried powder was placed in a $6'' \times 2'' \times 1\frac{1}{2}''$ silica boat. The boat was then placed in a 3'' diameter mullite tube which was in a cold (room temperature) CM Rapid Temperature tube furnace. A mixture of 95% $N_2$-5% $H_2$ (by volume) was then flushed through the mullite tube at a flow rate of 4 cubic feet per hour (CFH) for a period of 30 minutes to remove air from the tube and to maintain a reducing atmosphere over the powder during the firing.

The furnace was then programmed to reach the optimum firing temperature of 942° C. over a 3-hour time period. (Times shorter than this result in a phosphor with a reduced emission intensity). The boat with the powder was then allowed to remain in the furnace at 942° C. for an additional 4 hours with the gas mixture still continuously flowing over the powder during this time period and also during the cooling time cycle. After 4 hours, the furnace power was shut off and the furnace was allowed to cool to room temperature.

The soft phosphor cake was then removed from the furnace, broken up, and sieved through a 325 mesh screen.

The phosphor was then washed with hot deionized water and dried.

The phosphor is is now ready to be dispersed into a fluorescent lamp coating suspension which will be used to coat a bulb that will subsequently be manufactured into a fluorescent lamp. The structure of fluorescent lamps as well as the processes for fabricating such types of lamps are well known in the lighting art.

Although the previous examples have involved $Eu^+$-activated strontium borate phosphor, the present invention is not to be construed as being limited thereby. The method of the present invention is equally applicable to the preparation of other phosphors.

The advantages of control of phosphor particle size by raw material additions in the solution, elimination of a pre-firing step and subsequent powder pulverizing, and a final soft phosphor cake, are all accomplishments that are extremely beneficial in the synthesis procedure(s) for luminescent materials.

While there has been shown and described what at present are considered preferred embodiments of the invention, it will be obvious to those skilled in the art that various changes and modifications may be made therein without departing from the scope of the invention as defined by the appended claims.

What is claimed is:

1. A method for preparing divalent europium doped strontium orthoborate phosphor having the empirical formula:

$$Sr_{1-x}B_4O_7:Eu_x^{+2}$$

wherein x is from about 0.005 to about 0.05, the method comprising:
preparing a solution comprising europium (3+) and strontium in molar proportions equal to their respective molar proportions in the phosphor and boron in a molar proportion of about 4 to about 4.2:
precipitating the europium (3+), strontium, and boron from the solution by adding a precipitating agent to the solution;
spray drying the solution, including the precipitate, to form a spray dried powder; and
firing the spray dried powder in a single firing step in a reducing atmosphere comprising:
(a) increasing the temperature of the spray dried powder at an even rate no faster than about 5.5° C./minute from room temperature to a firing temperature of from about 920 to about 942° C.; and (b) maintaining the temperature of the spray dried powder at the firing temperature for a period of at least 4 hours to produce the phosphor.

2. A method in accordance with claim 1 wherein the firing step is carried out in a flowing reducing atmosphere.

3. A method in accordance with claim 1 wherein the single firing step is carried out in a furnace equipped with a microprocessor programmed to increase the temperature at the specified rate.

4. A method in accordance with claim 3 wherein the firing step further comprises permitting the phosphor to cool to room temperature within the furnace.

5. A method in accordance with claim 4 wherein the firing step is carried out in a flowing reducing atmosphere.

6. A method in accordancd with claim 1 wherein the rate is from about 4.2°-5.5° C./min.

7. A method in accordance with claim 1 wherein the rate is from about 5.1°-5.2° C./minute.

8. A method in accordance with claim 1 wherein the firing temperature is 942° C.

9. A method in accordance with claim 1 wherein the precipitating agent is an aqueous base.

* * * * *